United States Patent
Volkmann

[15] 3,651,563
[45] Mar. 28, 1972

[54] DOUBLE ANCHORING MECHANICAL SANDWICH PANEL FASTENER INSERT

[72] Inventor: Josef F. Volkmann, Tustin, Calif.
[73] Assignee: Shur-Lok Corporation, Santa Ana, Calif.
[22] Filed: Dec. 18, 1969
[21] Appl. No.: 886,292

[52] U.S. Cl. ............................29/523, 52/617, 151/41.73, 151/41.74
[51] Int. Cl. .........................E04c 2/36, F16b 39/22
[58] Field of Search ..................52/617, 705, 741; 85/71, 73, 85/74, 75; 151/41.73, 41.74; 29/522, 523, 455 LM

[56] References Cited

UNITED STATES PATENTS

| | | | |
|---|---|---|---|
| 1,795,057 | 3/1931 | Tomkinson | 85/75 |
| 1,919,901 | 7/1933 | Noonan | 85/75 |
| 2,955,504 | 10/1960 | Lovrinch et al. | 85/75 |
| 3,143,915 | 8/1964 | Tendler | 85/71 |
| 3,296,765 | 1/1967 | Rohe et al. | 52/617 |
| 3,364,808 | 1/1968 | Fischer | 85/74 |

FOREIGN PATENTS OR APPLICATIONS

| | | | |
|---|---|---|---|
| 6,508,503 | 1/1967 | Netherlands | 85/73 |
| 445,206 | 2/1968 | Switzerland | 85/73 |

Primary Examiner—Alfred C. Perham
Attorney—Lynn H. Latta

[57] ABSTRACT

A fastener insert which develops clamping anchorage to a panel skin by forming a bulbed secondary head in a shell by compression resulting from drawing a nut into the shell under interfering engagement between the two, and secondary anchorage in the panel core by a plurality of petals which are expanded into the core by action of an annular head on the nut as the nut is drawn into the shell.

3 Claims, 8 Drawing Figures

Patented March 28, 1972 3,651,563
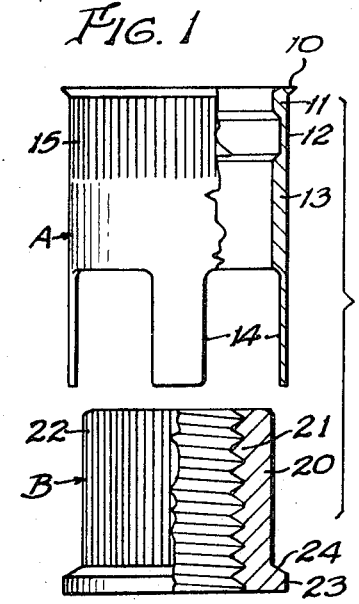
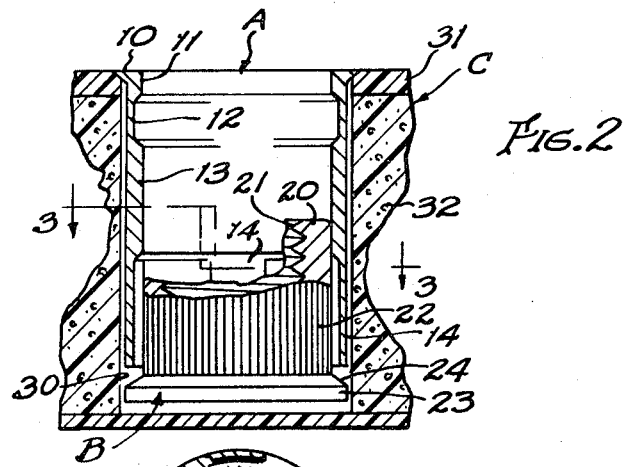
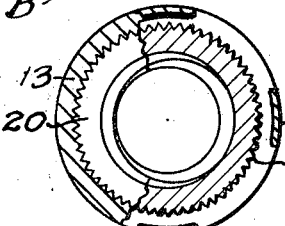
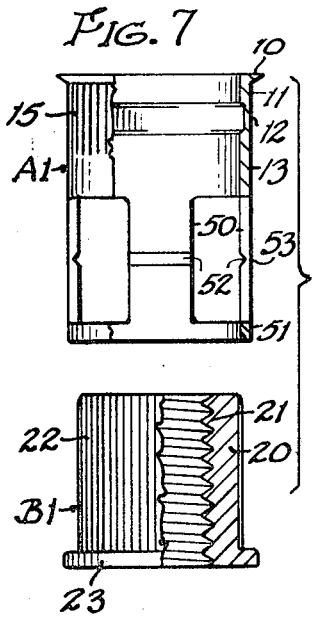
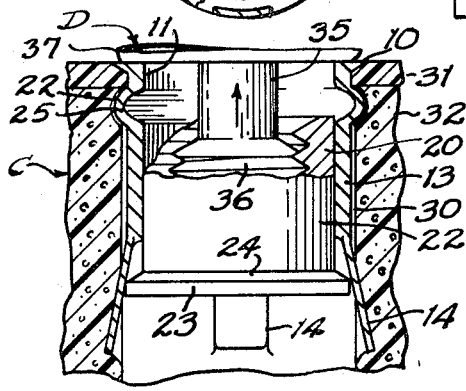
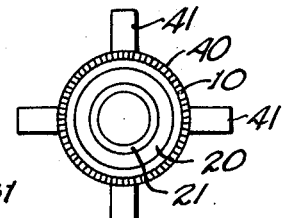
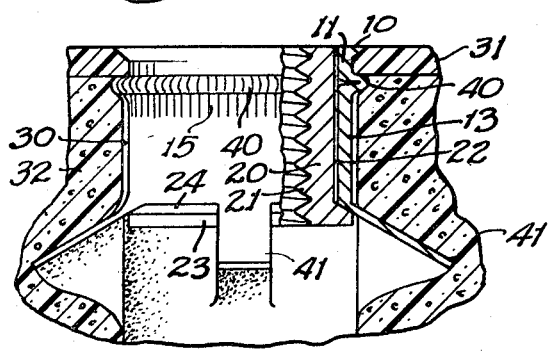
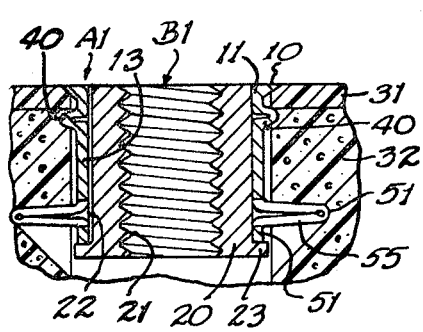
INVENTOR.
JOSEF F. VOLKMANN
BY
Lynn H. Latta
ATTORNEY

DOUBLE ANCHORING MECHANICAL SANDWICH PANEL FASTENER INSERT

BACKGROUND OF THE INVENTION

Inserts of sleeve form which clamp a panel skin or other sheet or plate member between an end head and a bulbed secondary head developed by subjecting the insert sleeve to compression, have long been known and widely used in the fastener art, as exemplified by the following patents:

| Cushman | 2,967,593 |
| Rohe et al. | 3,197,854 |
| Rohe et al. | 3,296,765 |
| Wigginton | 1,296,765 |
| Reiter | 1,962,035 |

Such fasteners, when installed in sandwich panels of very low density core construction, usually are provided at both ends with means to grip the respective skins of the panel, and hence are relatively complex and expensive in construction and installation.

Fasteners which are attached to a plate or sheet or other mounting body by the expansion of petals on an end of a tubular fastener body, are likewise known and used in the art. Such fasteners are disclosed in the following prior patents:

| Best | 2,358,783 (insert type) |
| Crowley | 2,341,589 |
| Campbell | 2,525,117 |
| Benton | 2,403,330 |

Insert fasteners for sandwich panels with low density core structure, installed by anchoring the fastener in a surrounding body of potting compound injected into a hole in the panel and hardened around the insert, have been largely resorted to for adequate anchorage in such panels, and widely used, but are relatively expensive in construction and installation.

SUMMARY OF THE INVENTION

With the general object of providing a relatively simple and less expensive insert, especially adaptable for use in sandwich panels having core structure of medium density, with considerably more substance than the extremely low density core of honeycomb cellular structure widely used in airframe construction, the invention provides an insert comprising a shell and a nut, the nut being initially assembled in an end of the shell which is composed of a plurality of circumferentially spaced longitudinal fingers or bars, this initial assembly being inserted into a hole drilled through one skin and into the core of a sandwich panel, and the insert assembly then being subjected to longitudinal compression by a suitable installation tool, resulting in the nut being drawn into a solid (circumferentially continuous) portion of the shell with an interference fit such as to transmit from the nut to such solid portion, a compressive load adequate to upset a thinned throat section of the shell into an annular bulbed head clamping the panel skin against an end head of the shell for primary anchorage. In the course of the same movement of the nut into the shell, an annular shoulder on the remote end of the nut operates to expand the fingers or longitudinal bars of the shell into a star-shaped formation of petals embedded in the panel core to provide supplementary anchorage.

A specific object of the invention is to provide a relatively simple two-part mechanically anchoring insert which can be installed in the manner outlined above. Another object is to provide such an insert in which both primary and supplemental anchorage operations are performed by a single, continuous drawing of the nut into the shell. A further object is to provide such an insert which does not require either potting or clamping to both skins of the panel.

Other objects will become apparent in the following specification, taken with the appended drawings, in which:

FIG. 1 is an exploded view of an insert embodying a preferred form of the invention, the two parts of the insert being shown prior to assembly, partially in side view and partially in longitudinal section;

FIG. 2 is a view of the preassembled insert, with the shell in section and the nut in elevation, in a preliminary stage of installation;

FIG. 3 is a cross-sectional view on line 3—3 of FIG. 2;

FIG. 4 shows the insert in an intermediate stage of installation;

FIG. 5 shows the insert as fully installed in a sandwich panel;

FIG. 6 is an end view of the insert in its fully installed configuration but with the panel not shown;

FIG. 7 is an exploded view of an insert embodying a modified form of the invention; and FIG. 8 shows the insert of FIG. 7, fully installed.

Referring now to the drawing in detail, I have shown in FIGS. 1–6 thereof, as an example of one form in which the invention may be embodied, a fastener comprising generally a metal shell A and a nut B, shown separately in FIG. 1. These two parts are preassembled for subsequent use, by press-fitting the nut into the shell in an assembly substantially as shown in FIG. 2. In an initial stage of installation, such assembly is inserted into a hole drilled in a sandwich panel C, also shown in FIG. 2.

Shell A has one end portion of cylindrical tubular construction, embodying at its end an annular head 10, a short neck 11 adjacent the head 10, a thinned throat section 12 for bulbing into a secondary head, and an intermediate body sleeve 13 of the same wall thickness as neck 11. The other end portion of shell A consists of a plurality of circumferentially spaced longitudinal bendable fingers (bar members) 14 which are preferably thinned down to less thickness than sleeve 13, chiefly at their internal faces, their external faces being substantially extensions of the cylindrical external surface of sleeve 13. The body sleeve 13 is adapted to grip and hold the body of nut B (of somewhat larger outer diameter than the inner diameter of sleeve 13) when the nut is press-fitted into the shell, penetrating a short distance into sleeve 13, in the preassembly of FIG. 2.

Throat section 12 is defined by an internal annular groove and its outer diameter is the same as that of sleeve 13 and neck 11. The tubular portion of shell A has a knurled surface of longitudinal flutes 15 extending from head 10 past the throat 12, for torque anchorage to the skin of panel C in the fully installed fastener.

Nut B comprises a cylindrical annular body 20 having internal threads 21 and a knurled external surface composed of longitudinal flutes 22. At one end the nut is provided with an annular head 23 which presents a frustoconical annular shoulder 24 facing into the shell A in the preassembled fastener. The knurled external surface has an outer diameter (of the outer edges of flutes 22) which is greater than the internal diameter of shell body sleeve 13, so that an interference relation is established between the sleeve 13 and the nut body 20 as the latter is driven into the shell. This interference relation is such as to establish a compressive loading of the shell by the nut during installation, adequate to upset the thinned throat section 12 into a bulbed structure 25 in an intermediate stage of installation approximately as shown in FIG. 4. An interference of lesser degree (but sufficient to hold the nut) is established between the leading end of the nut and the sleeve 13 in the preassembly.

Installation

The fastener of FIGS. 1–6 is installed by first drilling a hole 30 through a skin 31 of panel C and into (or through) its core 32. In a panel having a medium density core, the core structure is commonly of a foamed plastic material such as is indicated in FIGS. 2, 4 and 5, and its skin 31 is of a solid, dense high-strength plastic material.

As a second step, the preassembled fastener is inserted into hole 30 (FIG. 2).

As a third step, the insert is subjected to compression by a tool D adapted to exert a pulling action against nut B through a mandrel 35 having a bit 36 with a thread matching that of nut B and engaged in the internal threads 21 thereof. Pulling action may be powered pneumatically or hydraulically against a piston (not shown) on mandrel 35 within a cylinder 37 constituting the body of tool D.

As the nut B is drawn into the shell, its knurled flutes 22, forcibly embedded in the internal surface of sleeve 13 to increasingly greater axial depth, will develop a progressively increasing compressive loading of the tubular portion of the shell, while simultaneously the nut shoulder 24, moving against fingers 14, will spread them into increasingly flaring relation, pushing them into the yieldable foam body of core 32 outside the diameter of hole 30. As the compressive loading of the tubular portion of shell A is intensified, the thinned throat section 12 will be bulbed outwardly to increasingly greater extent.

In the final stage of installation, the nut shoulder 24 will be drawn tightly against the bases of fingers 14, where further advance will be effectively resisted by the solid end of sleeve 13 behind the now completely spread out fingers (FIG. 5) The compressive loading will then be intensified to whatever extent is necessary in order to complete the formation of a bulbed annular head 40 with the external knurling 15 embedded in the edge of panel skin 31 around the aperture therein, and with the skin clamped between the head 40 and the end head 10. At the inner end of the insert, the fingers 14 will have been formed into a star formation of petals 41 projecting radially into panel core 32 and securely engaged against the adjacent areas of the core which have been pushed back by the petals 41 and thus placed under compression. The nut A will have established a high torque load sustaining attachment to shell A by embedding its knurling 22 in the inner surface of shell body 13. Petals 41 will provide very substantial torque and axial load-holding anchorage in core 32, supplementing the primary anchorage of bulbed head 40 to panel skin 31.

Modified Form—FIGS. 7 and 8

FIG. 7 shows a modified shell A1 having tubular portion 10, 11, 12, 13 the same as in FIG. 1, but having, instead of fingers 14, a plurality of circumferentially spaced bar members 50 of strap form, integrally joined at one end to body sleeve 13 and at their other ends to an end ring 51 formed as a short residual annular section of the tubing wall which has been cut away to form the bars 50. Midway between their ends, bars 50 are provided with transverse notches 52, leaving weakened webs 53 adapted to function as hinges where the bars 50 will collapse and double back upon themselves, when compressively loaded by engagement of annular head 23 against end ring 51 as nut B1 is drawn into shell A1. In the preassembly nut 20 has its leading end pressed into sleeve 13 for a short distance and its head 23 may abut or be adjacent the end ring 51. Upon installation, pressure is applied by head 23 against end ring 51 causing the bars 50 to break outwardly and to collapse with a hinging action at webs 53. The collapsing of bars 50 will continue as nut A penetrates the shell body 13 with a progressive increase in compressive loading, which will be effective to collapse the thinned throat 12 into the bulbed head 40.

The bars 50, when fully collapsed, become a star formation of anchor petals 55 anchored in core 32 similar to the anchorage of petals 41 in FIG. 5.

By forming the bulbed secondary head at least partially before the secondary anchorage petals have been fully spread, the extent to which the petals must move axially against the core material, is reduced. This is more important in installations in denser core materials and less important in lighter, more yieldable core materials.

I claim:

1. A method of installing a fastener in a hole extending through a skin and into a lower density core of a sandwich panel, comprising:
providing a fastener preassembly of a shell comprising a tubular portion having an annular head at its one end, and a plurality of circumferentially spaced bendable bars projecting axially from its other end; and a nut having a body held in said shell in a preassembly of said nut and shell receivable in said hole with said head in position for external engagement against said skin with said nut disposed toward the bottom of said hole; said tubular portion of the shell including a thinned annular throat and a body sleeve adjacent said throat; said method comprising the following steps:
inserting a tool mandrel through said shell and securing its end to said nut;
subjecting said fastener preassembly to axial compression by applying a pull to said mandrel while simultaneously applying pressure to said end head, thereby drawing said nut into said body sleeve;
utilizing an interfering relation between said nut and sleeve to transmit compression to said throat such as to expand the same into an annular, bulbed secondary head engaging said skin internally in opposed relation to said end head and cooperating therewith to clamp said skin between said heads in a primary anchorage to said skin; and
causing said nut to exert a spreading action against said bars to bend them outwardly into a formation of radiating petals embedded in said core outside the diameter of said hole to provide a secondary anchorage of said fastener.

2. The method defined in claim 1:
said bars having free ends which become the radially outer extremities of said petal formation.

3. The method defined in claim 1:
said bars having ends integrally joined to an end ring at the end of said shell remote from said end head and having internal transverse notches midway between their ends, and having weakened webs radially outwardly of said notches;
said nut exerting said spreading action by applying end pressure to said ring;
said bars being collapsed outwardly at said weakened webs and folded upon themselves in the formation of said radiating petals.

* * * * *